United States Patent [19]

Naruoka et al.

[11] Patent Number: 5,119,687
[45] Date of Patent: Jun. 9, 1992

[54] ARTICULATED ROBOT

[75] Inventors: Shinji Naruoka; Osamu Toyama, both of Kariya; Takashi Kawasaki, Nagoya; Hisanori Nakamura, Toyota, all of Japan

[73] Assignees: Toyoda Koki Kabushiki Kaisha, Kariya; Toyota Jidosha Kabushiki Kaisha, Toyota, both of Japan

[21] Appl. No.: 677,517

[22] Filed: Mar. 29, 1991

[30] Foreign Application Priority Data

Mar. 30, 1990 [JP] Japan ................... 2-86798

[51] Int. Cl.⁵ .................. F16H 55/18; B25J 17/00; B25J 18/00
[52] U.S. Cl. ........................ 74/479; 74/397; 74/409; 901/25
[58] Field of Search ............ 74/392, 397, 409, 479; 901/25

[56] References Cited

U.S. PATENT DOCUMENTS

| | | | |
|---|---|---|---|
| 1,549,845 | 8/1925 | Munz | 74/397 X |
| 2,235,179 | 3/1941 | Tangen | 74/397 |
| 3,426,610 | 2/1969 | Scharer | 74/397 |
| 3,610,058 | 10/1971 | Mueller et al. | 901/25 X |
| 4,399,718 | 8/1983 | Zimmer | 74/409 |
| 4,435,120 | 3/1984 | Ikeda et al. | 74/409 X |
| 4,532,822 | 8/1985 | Godlewski | 74/397 |
| 4,806,069 | 2/1989 | Tellden | 74/409 X |

FOREIGN PATENT DOCUMENTS

| | | | |
|---|---|---|---|
| 152859 | 4/1917 | Fed. Rep. of Germany | 74/392 |
| 1274919 | 12/1986 | U.S.S.R. | 901/25 |

Primary Examiner—Allan D. Herrmann
Attorney, Agent, or Firm—Oblon, Spivak, McClelland, Maier & Neustadt

[57] ABSTRACT

An articulated robot having a swivel base supported on a support base for swivel movement about a vertical axis, a first arm pivoted on the swivel base for swing movement about a first swing axis perpendicular to the vertical axis and a second arm pivoted on the forward end of the first arm for swing movement about a second swing axis parallel to the first swing axis, wherein a servomotor for moving the second arm is mounted on the swivel base. The robot is provided with a gear train transmitting the rotation of the servomotor to the second arm, and the gear train is composed of a drive gear rotated by the servomotor to be rotated about the first swing axis, a driven gear fixed to the second arm for rotational movement about the second swing axis together with the second arm, and three idler gears disposed between the drive gear and driven gear for transmitting the rotation of the drive gear to the driven gear. The robot is also provided with a backlash eliminating mechanism for eliminating backlashes between those gears.

7 Claims, 9 Drawing Sheets

ARTICULATED ROBOT

BACKGROUND OF THE INVENTION

1. Field of the Invention

The present invention relates to an articulated robot. More particularly, it relates to an articulated robot utilizing a gear mechanism for transmitting rotation of a servomotor to a second arm.

2. Discussion of the Prior Art

In a conventional articulated robot, rotation of a servomotor is transmitted to the second arm through various mechanisms such as a parallel link mechanism, a belt drive mechanism, a direct drive mechanism and the like. A robot using the belt drive mechanism has a problem in that the stiffness is generally low. A robot having the direct drive mechanism has a problem in that a heavy servomotor must be attached to the forward end of the first arm for swinging the second arm. Since the heavy servomotor acts as a load on the first arm, which produces a gravity and an inertia moment, the load capacity of the robot is relatively small. For the reason above, in an articulated robot which is required to have a large load capacity, a parallel link mechanism is used for transmitting the rotational torque of the servomotor to the second arm, as disclosed in the Japanese laid open utility model publication 1-121683.

Figure 8:
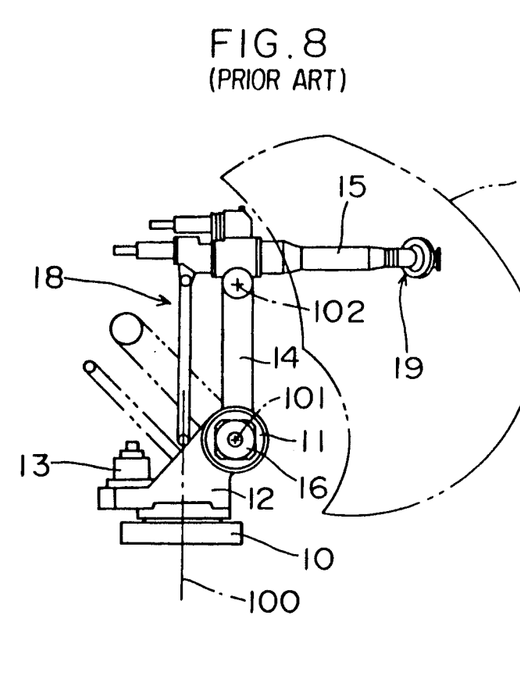
FIG. 8 is a side view of a conventional articulated robot.

As shown in FIG. 8, the robot is provided with a swivel base 12 supported on a support base 10 for rotation about a vertical axis, a first arm 14 whose lower end is pivoted on the swivel base 12 for swing movement about an axis perpendicular to the vertical axis and a second arm 15 pivoted on the forward end of the first arm 14 for a swing movement about an axis parallel to the swing axis of the first arm 14. The second arm 15 is provided with a wrist portion 19 at its forward end. The robot is further provided with a first axis servomotor 13 for rotating the swivel base 12 with respect to the support base 10, a second axis servomotor 16 for swinging the first arm 14 with respect to the swivel base 12 and a third axis servomotor (not shown) for swinging the second arm 15 with respect to the first arm 14. The rotational torque of the third axis servomotor is transmitted to the second arm 15 through a parallel link mechanism 18.

Figure 9A:
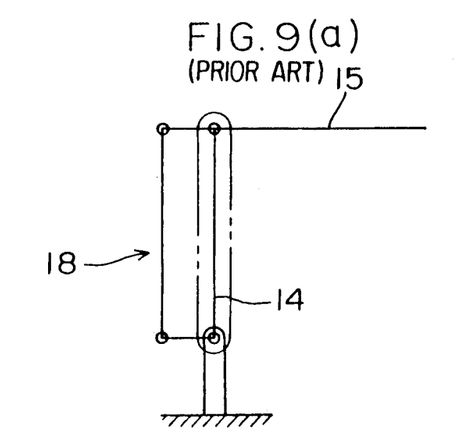
FIGS. 9(a) and 9(b) are charts showing the operation of the conventional articulated robot.
Figure 9B:
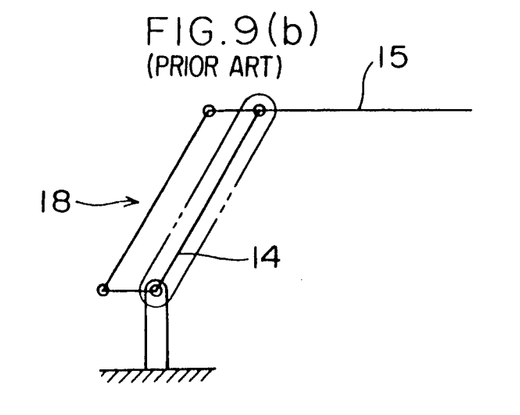

In the parallel link robot, the posture of the second arm 15 does not change when only the first arm 14 is driven to swing from it neutral angle shown in FIG. 9(a) to a predetermined angle shown in FIG. 9(b). With this feature, the parallel link robot has an advantage that the angular position of the arms are easily controlled. Also, by employing the parallel link mechanism, the third axis motor swinging the second arm 15 can be mounted on the swivel base 15, thereby decreasing the load applied to the first arm 14.

However, the parallel link robot has a disadvantage that the wrist portion 19 cannot be moved to the back side of the robot and the upper side of the robot, because the working area of the robot is limited in the front side of the robot, as shown by the broken line 1 in FIG. 8. This problem occurs because of interference between the link mechanism 18 and the swivel base 12.

SUMMARY OF THE INVENTION

Accordingly, it is an object of the present invention to provide an improved articulated robot capable of moving its wrist portion to the back side thereof, thereby widening the working area.

Another object of the present invention is to provide an improved articulated robot having advantages of a parallel link robot, such as a large load capacity, without using any parallel link mechanism.

Briefly, an articulated robot according to the present invention having a first arm pivoted on a base for swing movement about a first swing axis and a second arm pivoted on the forward end of the first arm for swing movement about a second axis parallel to the first swing axis. The robot is provided with a first gear supported on the base for rotational movement about the first swing axis, a second gear supported at the forward end of the first arm for rotational movement about the second swing axis and drivingly connected to the second arm, a servomotor mounted on the base for rotating the first gear, and a gear train for transmitting the rotation of the first gear to the second gear. The gear train is composed of a single idler gear or idler gears of odd number.

With this configuration, the second arm can be moved to both of the front side and rear side of the robot, thereby widening the working area. Further, in the event that only the first arm is swung about the first swing axis, the posture of the second arm does not change.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 3(b) is an enlarged view showing idler gears;

DETAILED DESCRIPTION OF THE PREFERRED EMBODIMENT

Figure 1:
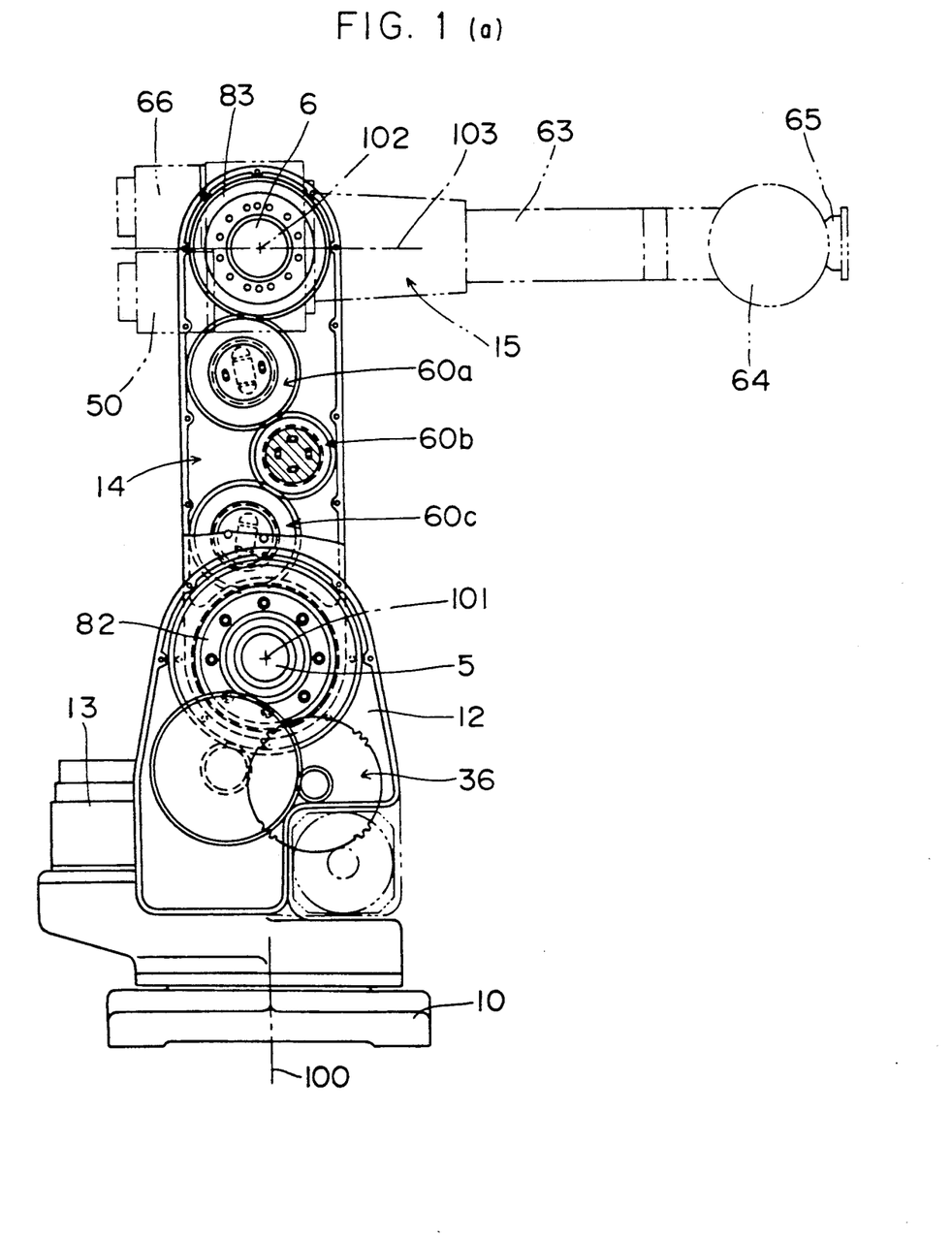
FIGS. 1(a) and 1(b) are cutaway side views of an articulated robot according to the present invention.
Figure 1B:
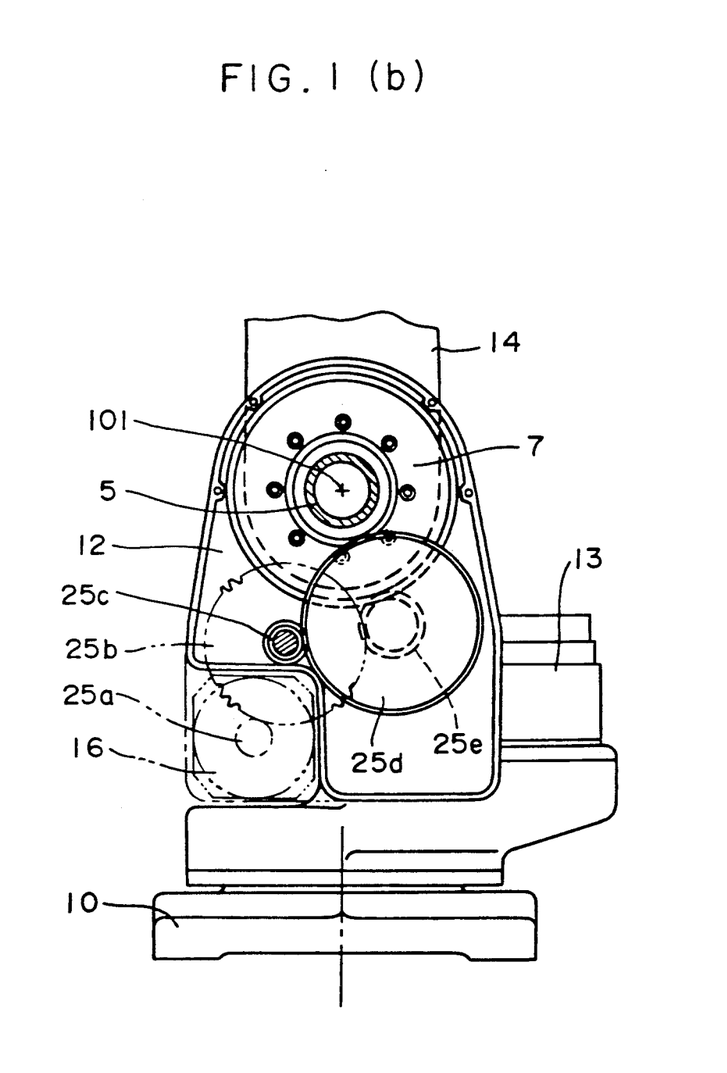
Figure 2:
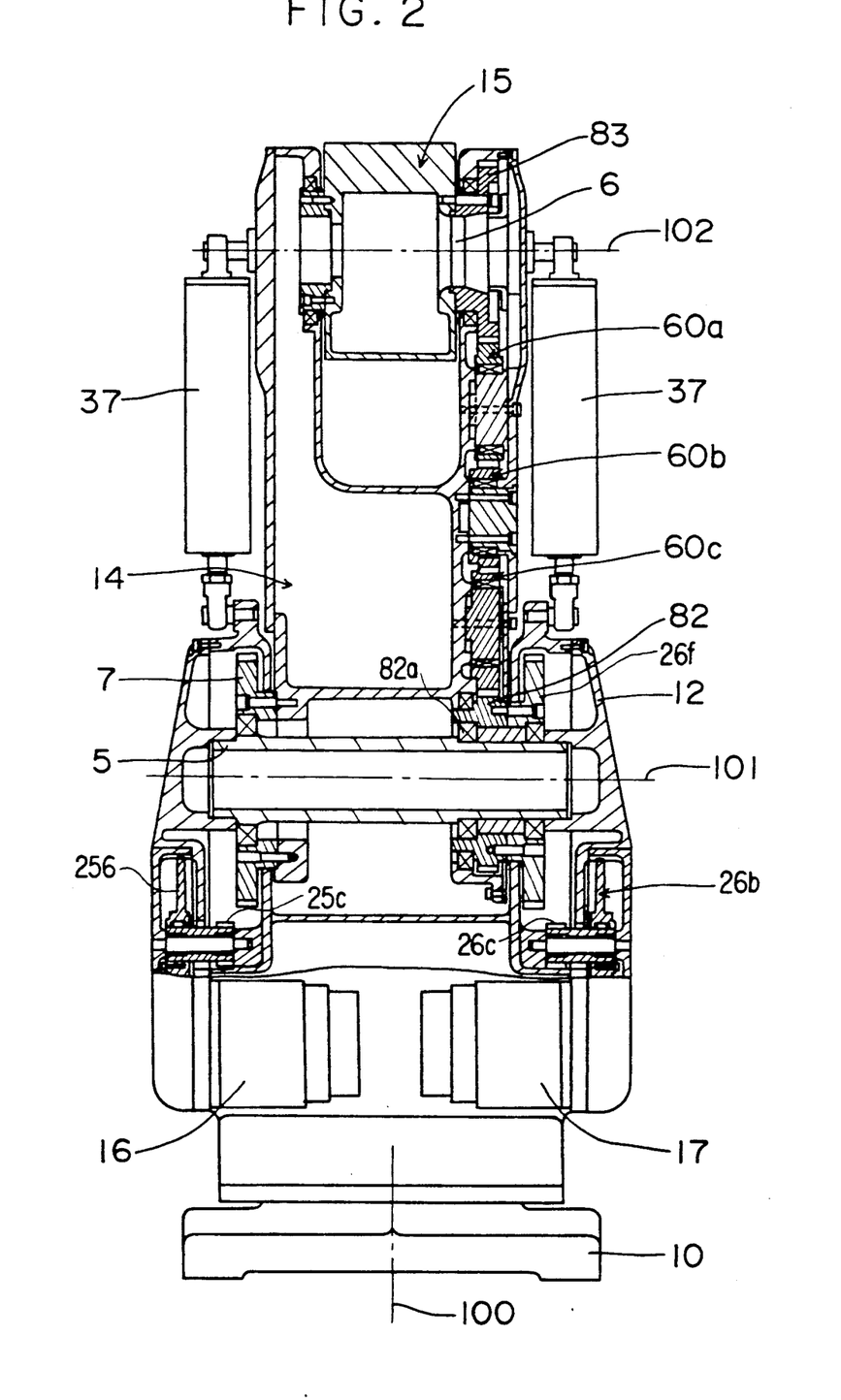
FIG. 2 is a partially cutaway rear view of the articulated robot shown in FIG. 1.

Referring now to the drawings and particularly, to FIGS. 1(a), 1(b) and 2 thereof showing an embodiment of the present invention, a swivel base 12 is supported on a support base 10 for swivel movement about a vertical axis 100. The swivel base 12 is rotated by a first axis servomotor 13 mounted on the swivel base 12 itself. The base end portion of a first arm 14 is pivoted on the swivel base 12 through a first cylindrical shaft 5 and a gear 7 for swing movement about a first swing axis 101 perpendicular to the vertical axis 100. The gear 7 is connected with the first arm 14 and is rotated by a second axis servomotor 16 mounted on the swivel base 12 through gears 25a, 25b, 25c, 25d and 25e, as shown in FIG. 1(b) so that the first arm 14 is swung about the first swing axis 101. Also, a first gear 82 is supported by the first cylindrical shaft 5 through a bearing 82a for rotation about the first swing axis 101. The first cylindrical shaft 5 is fixed to the swivel base 1 at its both ends. A gear 26f is also supported on the first cylindrical shaft 5 through a bearing and is coupled with the first gear 82 using bolts to be rotated therewith. At the upper end of the first arm 14, a pair of second cylindrical shafts 6 are supported for rotation about a second swing axis 102 parallel to the first swing axis 101. The base end of a second arm 15 is fixed to the second cylindrical shafts 6 so that the second arm 15 is swingable about the second swing axis 102. Disposed between the first gear 82 and a second gear 83 is a gear train composed of three idler gears 60a, 60b and 60c which are supported in the first arm 14 for rotations about rotational axes parallel to the first swing axis 101 and the second swing axis 102. The rotational centers of these idler gears 60a and 60c are offset from a first line connecting the first swing axis 101 and the second swing axis 102, and the idler gear 60b is offset from the first line in the opposite direction. A third axis servomotor 17 is mounted on the swivel base 12 for rotating the gear 26f through plural gears 26a, 26b, 26c, 26d and 26e, as shown in FIG. 1(a). Supported at the forward end of the second arm 15 is a twist wrist 63, which is rotated by a fourth axis servomotor (not shown) about an axis 103 coinciding with the center of the second arm 15. A swivel wrist 65 is supported at the forward end of the twist wrist 63 through a bend wrist 64, and the bend wrist 64 and swivel wrist 65 are swung by a fifth axis servomotor 50 and a sixth axis servomotor 66, respectively. Disposed between the swivel base 12 and the second arm 15 is a balance cylinder 37.

Figure 3A:
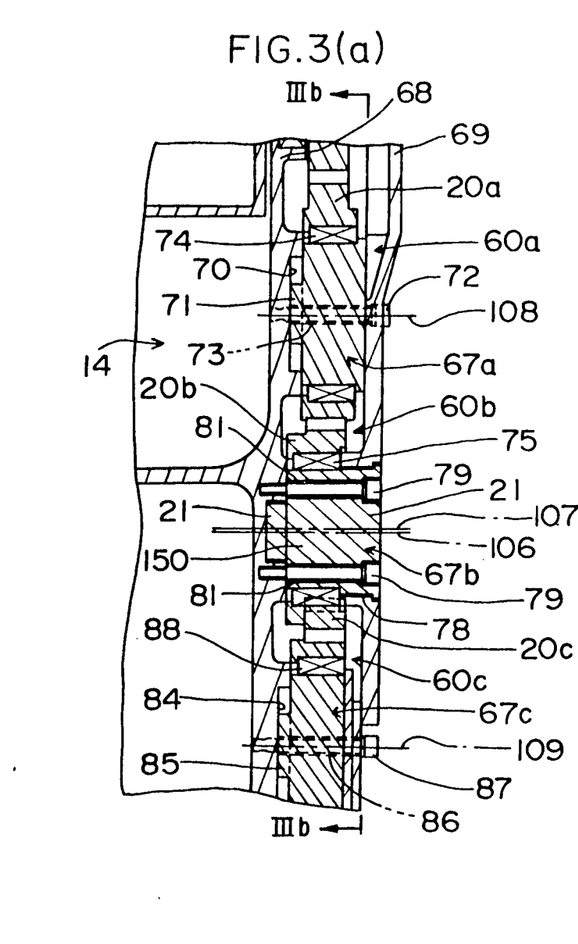
Figure 3B:
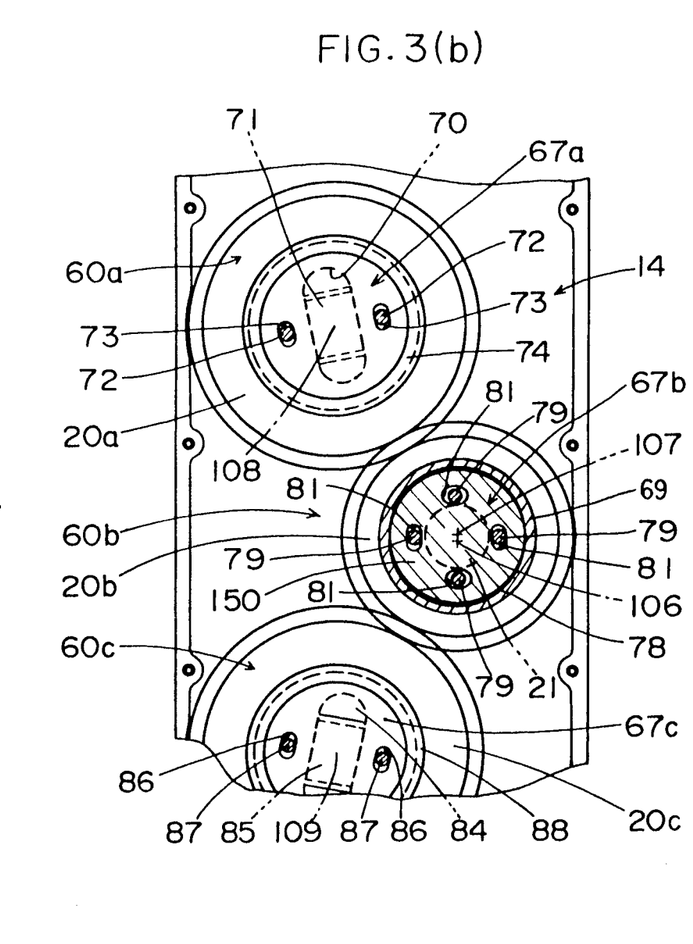
FIG. 3(b) is a sectional view along line IIIb —IIIb in FIG. 3(a)

A backlash eliminating mechanism used in the robot will now be described. Supporting shafts 67a, 67b and 67c respectively supporting the idler gears 60a, 60b and 60c are supported between an inside frame 68 and an outside flame 69 which constitute the first arm 14, as shown in FIGS. 3(a) and 3(b). The supporting shaft 67a is formed with a projection portion 71 having a rectangular cross section at its one end, and the projection portion 71 is mated with a guide hole 70 formed on the inside frame 68. The guide hole 70 is extended in a direction nearly parallel to a line connecting the rotational center of the second gear 83 and the rotational center of the idler gear 60b. The supporting shaft 67a is further formed with a pair of oval holes 73 at both sides of the projecting portion 71 through which a pair of bolts 72 are inserted for holding the supporting shaft 67a between the inside frame 68 and the outside frame 69. The tooth portion 20a of the idler gear 60a is supported by the supporting shaft 67a through a bearing 74.

Figure 6A:
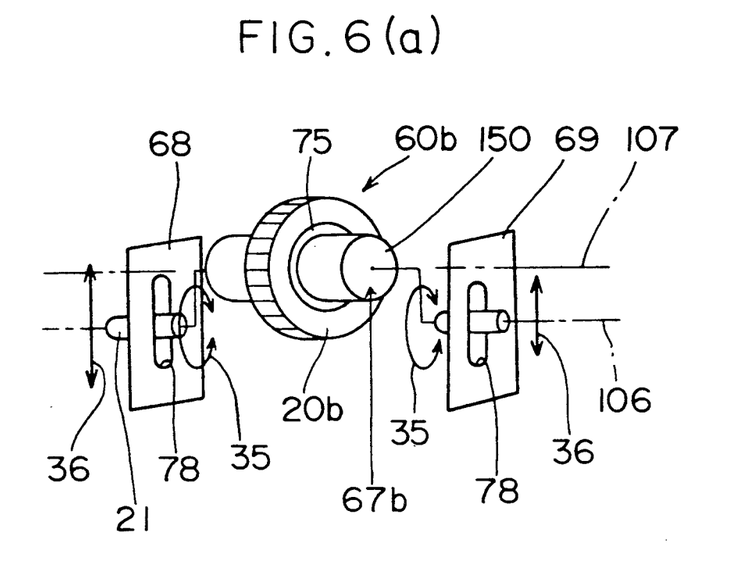
FIG. 6(a) is a schematic view showing an operational mode of a backlash eliminating mechanism of the robot.

The supporting shaft 67b is composed of an intermediate supporting portion 150 supporting the tooth portion 20b of the idler gear 60b through a bearing 75, and a pair of supporting portions 21 which are formed at both ends of the supporting shaft 67b. The center axis 107 of the intermediate supporting portion 150 is eccentric with respect to the center axis 106 of the supporting portions 21, as shown in FIG. 6(a), which is a schematic view showing an operational model of the above-described backlash eliminating mechanism. Each of the inside frame 68 and outside frame 69 is formed with a guide hole 78 extending in a direction parallel to a line connecting the rotational center of the first gear 82 and the rotational center of the second gear 83 so as to receive the respective supporting portions 21. The supporting shaft 67b is held between the inside frame 68 and outside frame 69 with four bolts 79 which axially penetrate the holes 81 formed in the supporting shaft 67b. The holes 81 are formed to have oval shapes to allow the supporting shaft 67b to be rotated about the center axis 106 and to be moved along the guide hole 78, when the bolts 79 are loosed.

The supporting shaft 67c is formed with a projection portion 85 having a rectangular cross section at its one end, and the projection portion 85 is mated with a guide hole 84 formed on the inside frame 68 for movement in a direction nearly parallel to a line connecting the center of the first gear 82 and the center of the idler gear 60b. The supporting shaft 67c is further formed with a pair of oval holes 86 at both sides of the projecting portion 85 through which a pair of bolts 87 are inserted for holding the supporting shaft 67c between the inside frame 68 and the outside frame 69. The tooth portion 20c of the idler gear 60c is supported by the supporting shaft 67c through a bearing 88.

The backlash adjustment using the above-described mechanism will be explained. When the bolts 72, 79 and 87 holding the supporting shafts 67a, 67b and 67c are loosened, the supporting shafts 67a, 67b and 67c are allowed to be moved, because the oval holes 73, 81 and 86 receive the bolts 72, 79 and 87 with clearances. The supporting shaft 67b can be rotated about the center axis 106 for changing the location of the tooth portion 20b of the idler gear 60b in a direction perpendicular to the first line connecting the rotational centers of the first and second gears 82 and 83. The movement is defined as a first movement and is indicated by an arrow 35 in FIG. 6(a). The supporting shaft 67b can also be moved along the guide hole 78 in a direction parallel to the first line. This movement is defined as a second movement and is indicated by an arrow 36 in FIG. 6(a). When the tooth portion 20b of the idler gear 60b is moved by the above mentioned first and second movements to eliminate a backlash between the idler gears 60a and 60b and a backlash between the idler gears 60b and 60c, the tooth portion 20a of the idler gear 60a is moved toward the second gear 83 along the guide hole 70 while the tooth portion 20c of the idler gear 60c is moved toward the first gear 82 along the guide hole 84. With this operation, a backlash between the idler gear 60a and the second gear 83 and a backlash between the idler gear 60c and the first gear 82 are also eliminated.

Figure 6B:
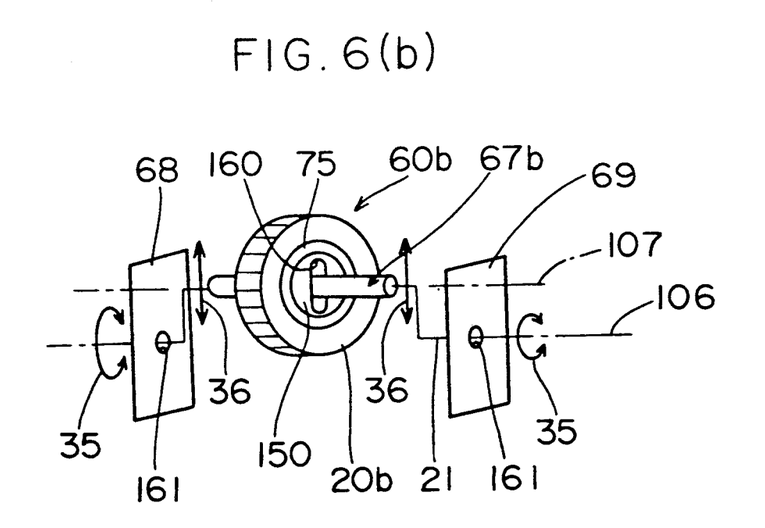
FIG. 6(b) is a schematic view showing an operational mode of a modification of the backlash eliminating mechanism.

The above adjustment mechanism can be modified as shown in FIG. 6(b). In this modification, both of the supporting portions 21 are supported by circular holes 161 while an oval hole 160 is formed in the intermediate supporting portion 150 for receiving the supporting shaft 67b for movement parallel to the first line connecting the rotational centers of the first and second gear 82 and 83.

Figure 4A:
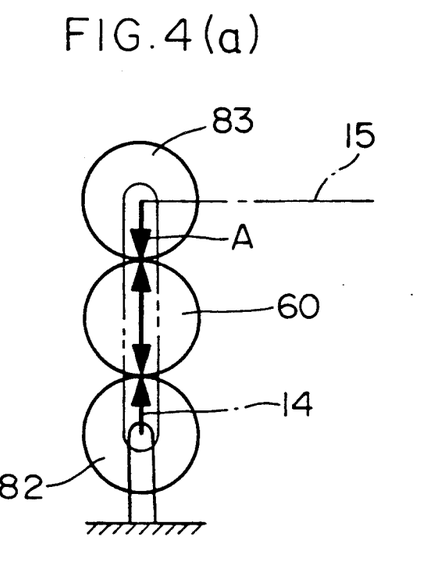
FIGS. 4(a) and 4(b) are explanatory charts showing the operation theory of the articulated robot.

The operation theory of the articulated robot will now be described with reference to FIGS. 4(a) and 4(c). In the above embodiment, three idler gears are used for rotating the second gear 83, which acts as a driven-side gear, in the same direction as that of the first gear 82, which acts as a drive-side gear, and for disposing the idler gears within the first arm 14 having a long and slender shape. Theoretically, the number of the idler gears is chosen to have odd number so as to rotate the second gear 83 in the same direction as that of the first gear 82. Therefore, in the model shown in FIGS. 4(a) and 4(b), only one idler gear is used to simplify the explanation. When the second axis servomotor 16 is driven for swinging the first arm 14, under the state that the third axis servomotor 17 is at a stop for prohibiting the first gear 82 from rotation, the gear train constitutes a planetary gear drive wherein the first gear 82 acts as a sun gear. Since the number of the teeth of the first gear 82 is the same as that of the second gear 83 and the rotational direction of the first gear 82 is the same as that of the second gear 83, the rotational ratio e of the second gear 83 with respect to the first gear 82 becomes 1. The rotational ratio e is expressed by the following formula.

$$e = (n2 - N)/(n1 - N) \quad (1)$$

where n1 represents a rotational amount of the first gear 82, n2 represents a rotational amount of the second gear 83, N represents a rotational amount of the first arm 14.

A formula obtaining the rotational amount n2 of the second gear 82, i.e., the rotational amount of the second arm 15 is obtained by transforming the formula (1) as follows.

$$n2 = e(n1 - N) + N \quad (2)$$

Figure 4B:
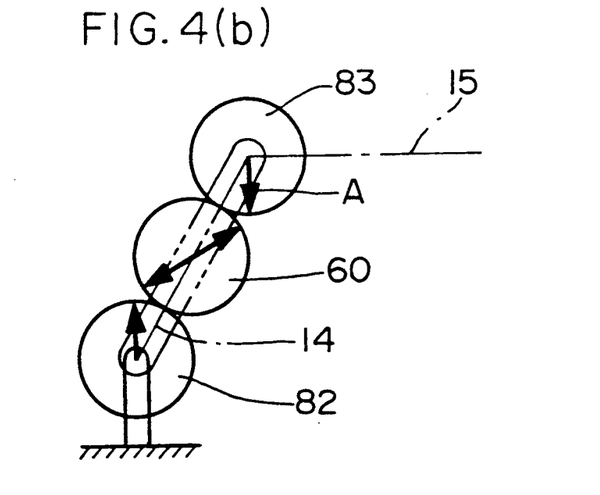

In this case, rotational ratio e is 1, and the rotational amount n1 of the first gear 82 is zero because the rotation of the first gear 82 is prohibited. Therefore, the rotational amount n2 of the second gear 83 becomes zero. This means that when the first arm 14 is swung under the state that the first gear 82 is at a stop, the second gear 83 rounds around the first gear 82, but does not rotate itself, as shown in FIG. 4(b). Therefore, the rotational angle position of the second gear 83 indicated by an arrow A does not change regardless of the swing movement of the first arm 14. As a result, the posture of the second arm 15, which is connected to the second gear 83, is constant. This characteristic is equivalent to that of the parallel link mechanism shown in FIGS. 9(a) and 9(b).

Figure 5:
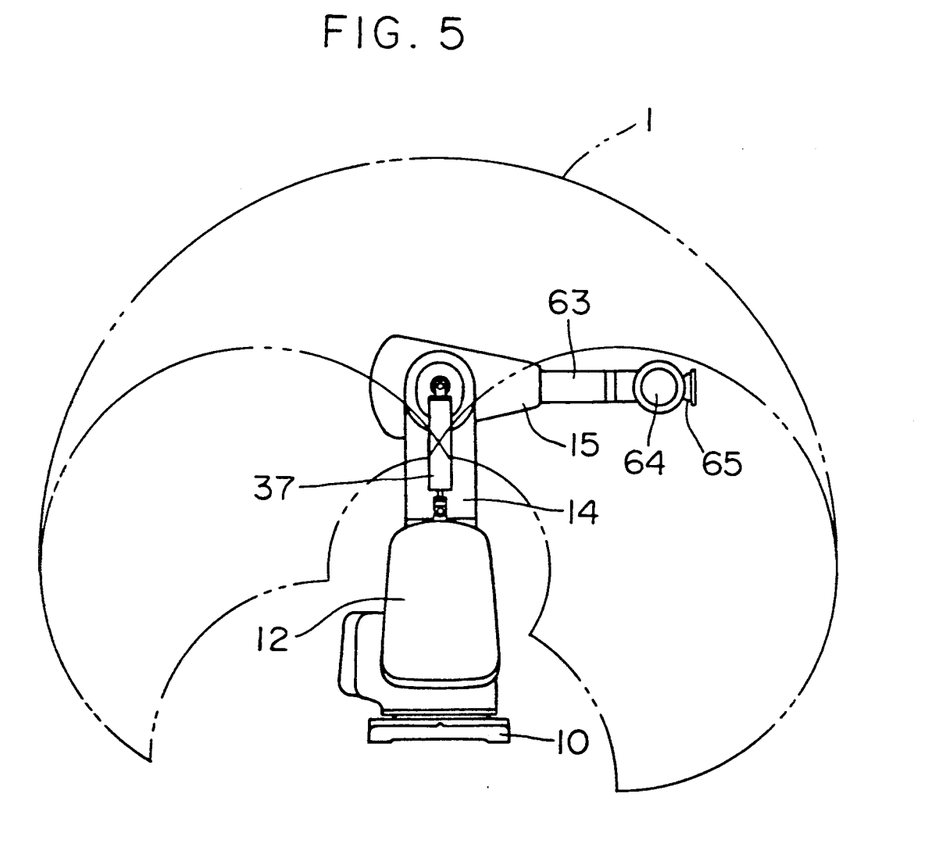
FIG. 5 is a chart showing the working area of the articulated robot.

In addition to the above-mentioned characteristic, the articulated robot according to the present embodiment has an advantage that the second arm 15 can be swung about the second swing axis 102 within an angular area of 330 degrees. Therefore, by swinging both of the first arm 14 and second arm 15, a hand or a tool attached to the swivel wrist 65 is moved within a wide working area extending from the upper side to both sides of the robot, as shown in FIG. 5.

As described above, the angular position of the second arm 15 can be controlled easily, because the posture of the second arm 15 does not change when the first arm 14 is swung by the second axis servomotor 16 without actuating the third axis servomotor 17. Further, the load applied to the second axis servomotor 16 can be decreased, because the third axis motor 17 for swinging the second arm 15 is mounted on the swivel base 12. Also, the robot according to the present invention has a wide working area extending from the upper side to both sides of the robot and a large load capacity. The large load capacity is realized by using gears, which have a high stiffness, for transmitting the rotational torque of the third axis servomotor to the second arm 15.

Figure 7A:
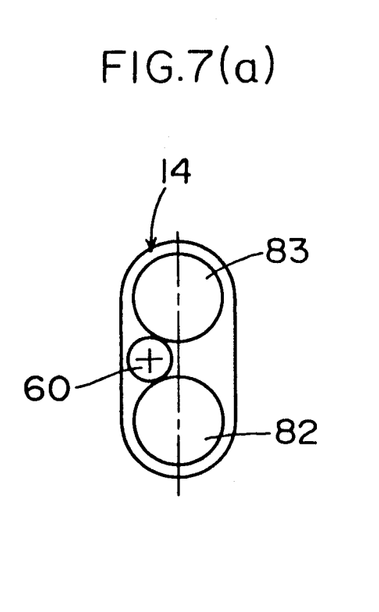
FIGS. 7(a), 7(b) and 7(C) are charts showing modified embodiments of the present invention.
Figure 7B:
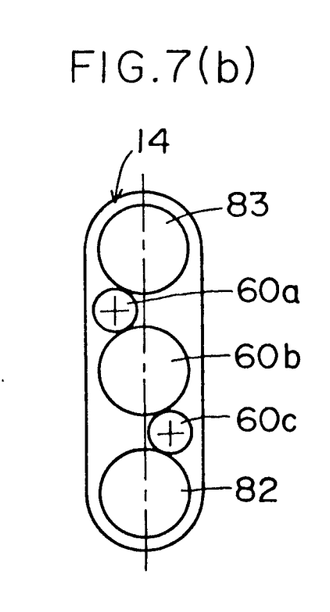
Figure 7C:
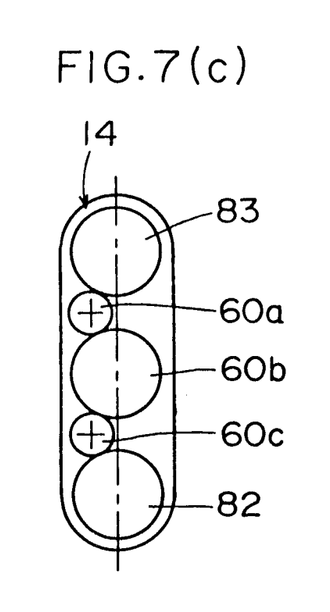

FIGS. 7(a), 7(b) and 7(c) show modified embodiments of the present invention. In the first modification shown in FIG. 7(a), only one idler gear 60 is disposed between the first and second gears 82 and 83, and the idler gear 60 is supported through a backlash adjustment mechanism, which is equivalent to that used for supporting the idler gear 60b in the above-mentioned embodiment. FIG. 7(b) and 7(c) show the second and third modifications wherein the idler gear 60b is supported for rotational movement at a location on the first line connecting the centers of the first and second gears 82 and 83, while the idler gears 60a and 60c are supported through backlash adjustment mechanisms for rotational movements at locations offset from the first line.

Obviously, numerous modifications and variations of the present invention are possible in light of the above teachings. It is therefore to be understood that within the scope of the appended claims, the present invention may be practiced otherwise than as specifically described herein.

What is claimed is:

1. An articulated robot having a first arm pivoted on a base for swing movement about a first swing axis and a second arm pivoted at the forward end of the first arm for swing movement about a second swing axis parallel to the first swing axis, said robot further comprising:
   - a first gear supported on said base for rotational movement about said first swing axis;
   - a servomotor mounted on said base for rotating said first gear;
   - a second gear supported at the forward end of said first arm for rotational movement about said second swing axis and drivingly connected to said second arm; and
   - a gear train comprising an odd number of idler gears disposed between said first and second gears for transmitting rotation of said first gear to said second gear.

2. An articulated robot as set forth in claim 1, wherein: said gear train is composed of a first idler gear meshed with said first gear, a second idler gear meshed with said second gear and a third idler gear disposed between said first and second idler gears to be meshed with said first and second idler gears.

3. An articulated robot as set forth in claim 2, wherein: said first and second idler gears are supported at positions offset in a first direction from a first line connecting the rotational center of said first gear and the rotational center of said second gear while said third idler gear is supported at a position offset from said first line in a second direction opposite to said first direction with respect to said first line.

4. An articulated robot as set forth in claim 3, wherein: said first idler gear is supported to be movable in a direction nearly parallel to a second line connecting the rotational center of the first gear and the rotational center of the third idler gear, said second idler gear is supported to be movable in a direction nearly parallel to a third line connecting the rotational center of the second gear and the rotational center of the third idler gear, and said third idler gear is supported to be movable in a direction parallel to said first line and a direction perpendicularly to said first line and is provided with an adjustment mechanism for moving said third idler gear and for fixing said third idler gear.

5. An articulated robot as set forth in claim 2, wherein: said first and second idler gears are supported at positions offset from a first line connecting the rotational center of said first gear and the rotational center of said second gear while said third idler gear is supported at a position on said first line.

6. An articulated robot as set forth in claim 2, wherein: said first idler gear is supported at a position offset in a first direction from a first line connecting the rotational center of said first gear and the rotational center of said second gear, said second idler gear is supported at a position offset from said first line in a second direction opposite to said first direction with respect to said first line, and said third idler gear is supported at a position on said first line.

7. An articulated robot having a first arm pivoted on a base for swing movement about a first swing axis and a second arm pivoted at the forward end of the first arm for swing movement about a second swing axis parallel to the first swing axis, said robot further comprising:
- a first gear supported on said base for rotational movement about said first swing axis;
- a servomotor mounted on said base for rotating said first gear;
- a second gear supported at the forward end of said first arm for rotational movement about said second swing axis and drivingly connected to said second arm; and
- a gear train comprising a single idler gear disposed between said first and second gears for transmitting rotation of said first gear to said second gear.

* * * * *